July 5, 1955

I. HERTZBERG 2,712,473

MACHINE FOR MAKING BRUSHES

Filed April 25, 1951

INVENTOR.
IRA HERTZBERG
BY
Mock + Blum
ATTORNEYS

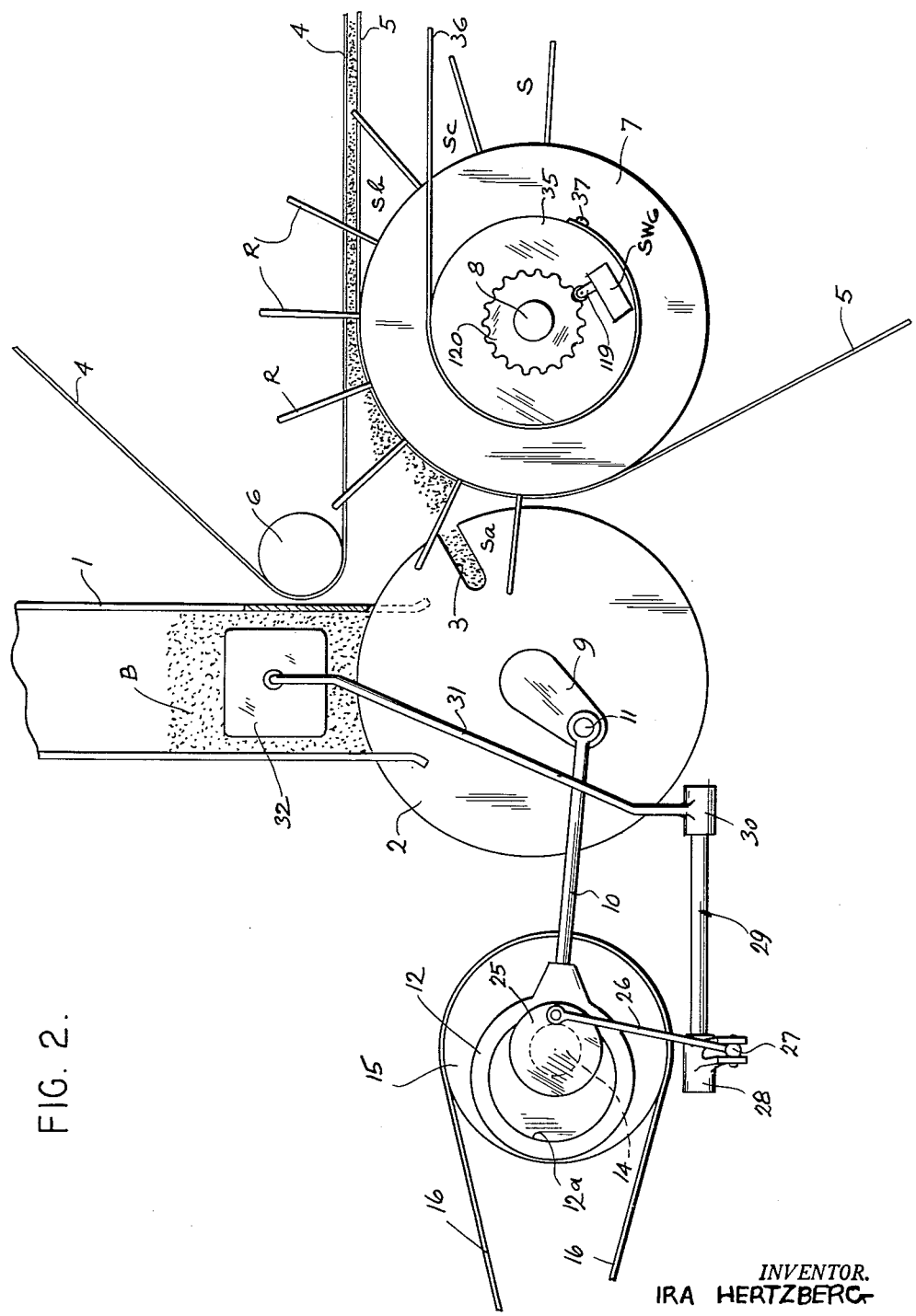

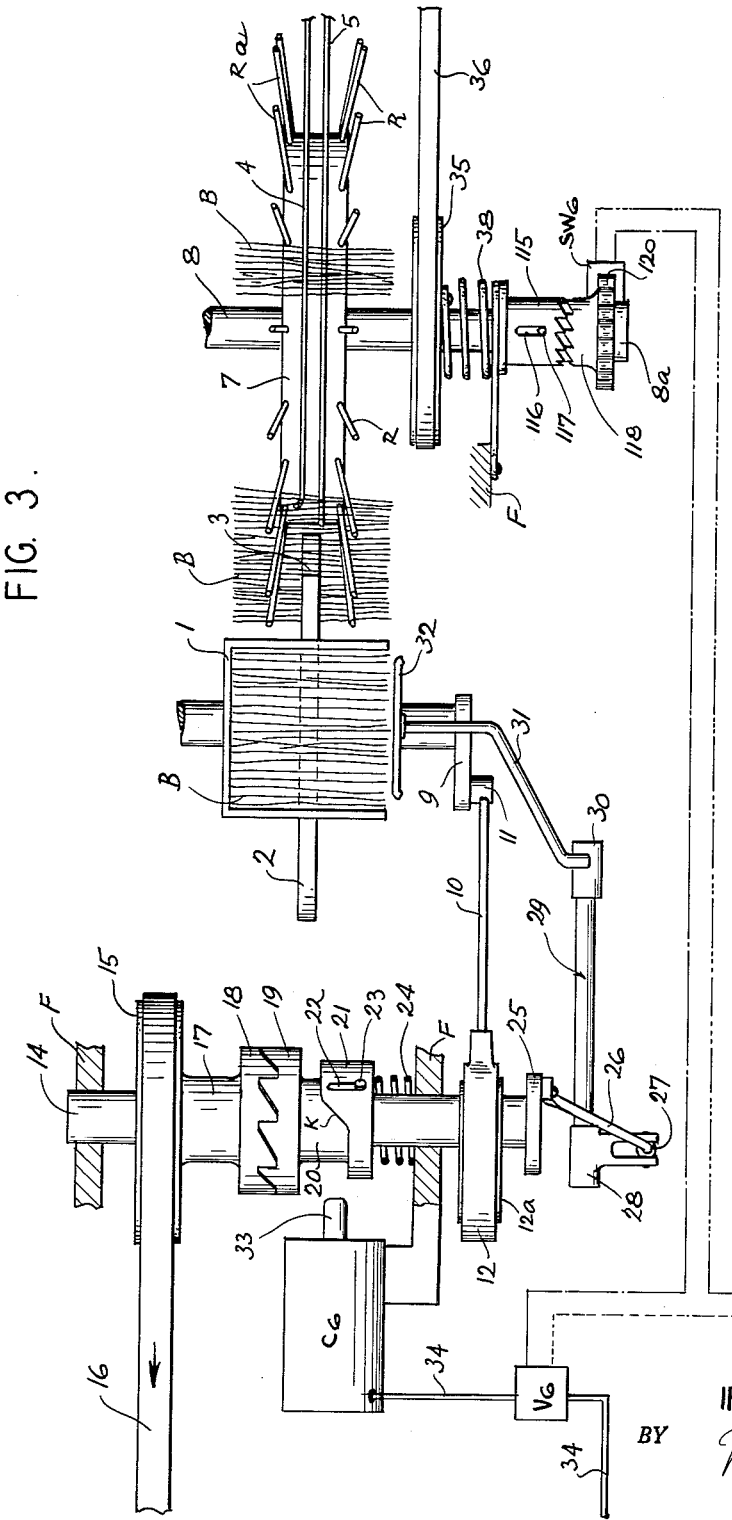

United States Patent Office 2,712,473
Patented July 5, 1955

2,712,473

MACHINE FOR MAKING BRUSHES

Ira Hertzberg, Yonkers, N. Y., assignor to H. Hertzberg & Son, Inc., New York, N. Y., a corporation of New York Application April 25, 1951, Serial No. 222,824

5 Claims. (Cl. 300—2)

This invention relates to a new and improved machine for making brushes.

One of the objects of the invention is to provide such a machine with a slide carriage which is reciprocated in an operating stroke and in a return or idler stroke.

During the operating stroke, a chuck of this carriage pulls a plurality of wires, between which the brush bristles are held. Close to the end of said operating stroke, or at the end of said operating stroke, the chuck is rotated to intertwist the wires to form an intertwisted core of the respective brush element, while the wires are clamped in a clamping zone which is spaced from said chuck.

Knives are then operated to cut the intertwisted core. During the return stroke, the chuck releases the respective end of said intertwisted core.

Numerous additional objects and advantages and features of the invention are stated in the annexed description and drawings, which disclose a preferred embodiment of the invention, to which it is not limited.

Fig. 2 is a detail enlarged longitudinal elevation of the hopper and feeding disc and transfer disc, with certain auxiliary parts;

Fig. 3 is a detail top plan view of Fig. 2, also showing some additional parts; and Fig. 4 is a detail view of the chuck.

Figure 1:
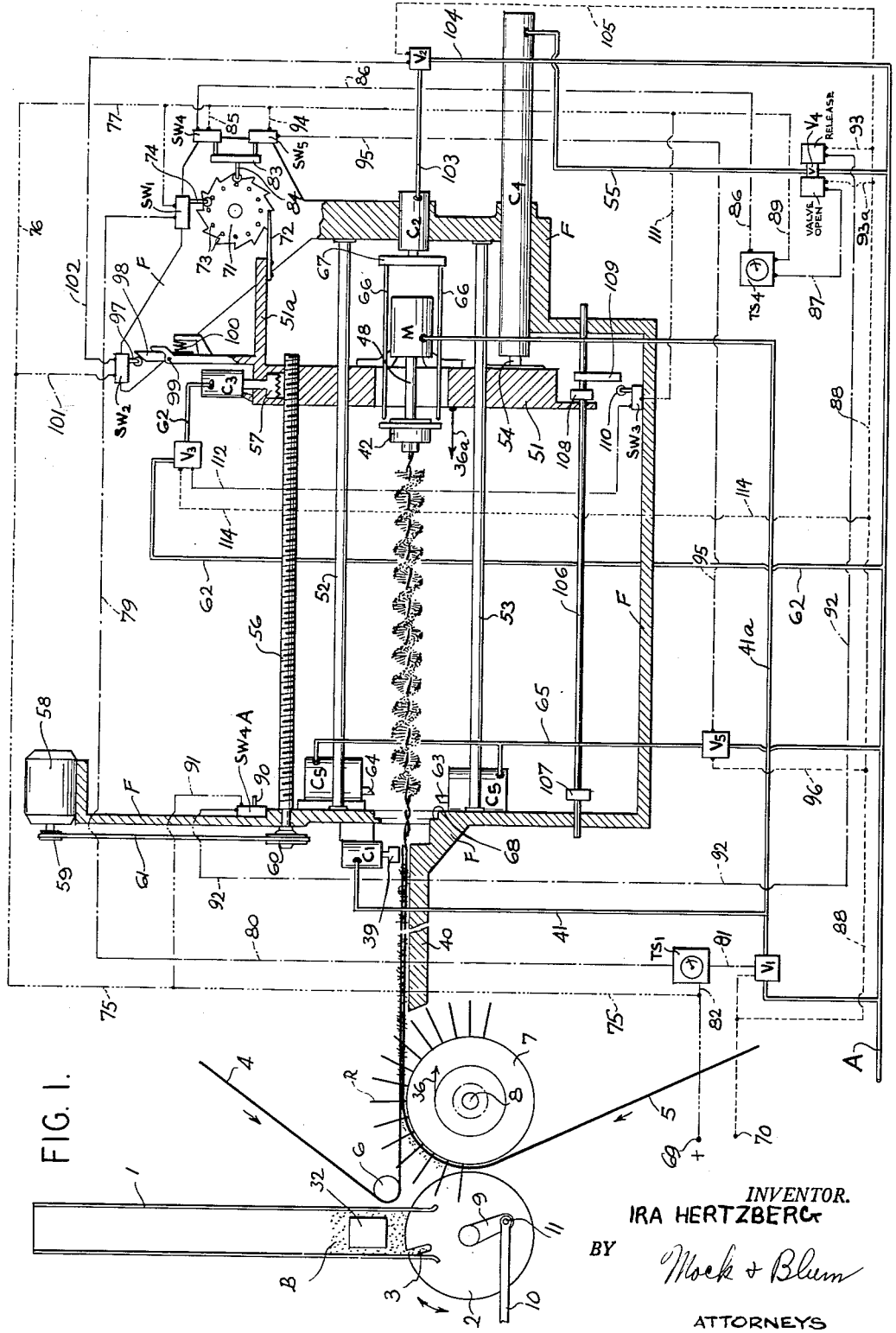
Fig. 1 is partially in vertical longitudinal elevation, and partially in vertical longitudinal section, and partially diagrammatic. It shows the improved machine.

*Hopper or chute 1 and its auxiliary parts*

The hopper 1 is open at its top and bottom. Bristles B are piled transversely in hopper 1.

Fig. 3 shows that hopper 1 is channel-shaped, with a planar longitudinal rear wall and transverse planar left and right walls which are perpendicular to said longitudinal rear wall, and no front wall, and no top or bottom walls. Hopper 1 may be of the conventional type which has a longitudinal front wall from top to bottom.

Since hopper 1 has no bottom wall, the bottom of the vertical pile of transversely disposed brush bristles B is supported on feed disc 2, which is rapidly oscillated around its horizontal and transverse axis, through a selected angle. Feed disc 2 has a feed recess 3. Fig. 1 shows the extreme left position of recess 3, at the end of the left or counterclockwise stroke of the oscillating feed disc 2. Fig. 2 shows the extreme right position of recess 3, at the end of the right or clockwise stroke of feed disc 2.

One end of arm 9 is fixed to disc 2. The other end of arm 9 is pivotally connected by pivot 11 to link 10, which is integral with eccentric collar 12, which is mounted turnably on eccentric 12a, which is fixed to and is eccentric relative to horizontal and transverse shaft 14, which is turnably mounted in frame F of the machine.

Shaft 14 extends through a bore of pulley 15, which is freely turnable relative to shaft 14. Conventional means prevent pulley 15 from shifting along shaft 14 in the direction of its axis. Pulley 15 is continuously rotated by endless belt 16, which is continuously actuated by any suitable source of power.

The top run of belt 16 is moved towards the left, as indicated by the arrow in Fig. 3, so that pulley 15 is continuously rotated counterclockwise.

Pulley 15 is integral with a hub 17, which is integral with a rear clutch-member 18, which is of any conventional type. Hence, pulley 15 is turnable in unison with its hub 17 and clutch-member 18 relative to shaft 14.

Shaft 14 extends through hub 17, clutch-member 18 and its associated front clutch-member 19, and through the integral hub 20 of clutch member 30. This hub 20 is integral with cam-head 21.

Cam-head 21 has a cam surface K and a transverse slot 22, which is parallel to shaft 14. A pin 21, which is fixed to shaft 14, extends through slot 22.

Clutch-member 19 is therefore transversely slidable relative to shaft 14, and clutch-member 19 rotates shaft 14, when the clutch 18—19 is coupled.

A biasing compression spring 24, whose respective ends abut cam-head 21 and frame F of the machine, normally maintains clutch-members 18 and 19 in their relative coupled positions which are shown in Fig. 3.

A longitudinal disc 25, which is concentric with the axis of shaft 14, is fixed to the front end of shaft 14. The upper end of link 26 is pivotally connected to disc 25. The lower end of link 26 is connected by a universal joint 27 to the arms of a collar 28, which is fixed to a longitudinal shaft 29, which is oscillated around a longitudinal and horizontal axis.

Collar 30 is fixed to shaft 29. Arm 31 is fixed to collar 30 and to an agitator plate 32, which makes oscillating contact with the resilient bristles B, in order to urge bristles B downwardly. As above noted, chute 1 may have a front longitudinal wall from top to bottom. In such case, disc 25 and the other parts of the agitating means are omitted.

The clutch 18—19 can be uncoupled, in order to stop the feeding oscillating movement of disc 2, by moving pin 33 longitudinally to the right of its normal non-operating position which is shown in Fig. 3. Said pin 33 then abuts cam-surface K, thus sliding clutch member 19 to uncouple the clutch 18—19.

Since the drawings are partially diagrammatic, they omit illustrations of many conventional parts.

Pin 33 is biased or yieldingly maintained in its normal non-operating position of Fig. 3 by a conventional spring, which is not shown.

Pin 33 is fixed to a piston, not shown, of cylinder C6. The means for operating pin 33 represent the means for operating other control members which are operated by compressed air.

Fig. 1 shows a main air-pipe A, whose left end is connected to a source of compressed air. A branch pipe 34 connects main pipe A to one end of cylinder C6.

When compressed air is admitted through branch pipe 34 into cylinder C6, pin 33 is moved temporarily to the right of its position of Fig. 3, against the force of the biasing spring of pin 33, until pin 33 abuts the cam surface K of cam collar 21. This shifts cam collar 21 and its associated front clutch member 19 forwardly against the force of spring 24, thus uncoupling clutch 18—19, and stopping the counterclockwise rotation of the temporarily uncoupled shaft 14. It is conventional to apply a brake to a shaft in order to stop its rotation quickly when said shaft is uncoupled, and also to apply such brake, simultaneously with the uncoupling of the shaft. Such conventional feature may be incorporated. The operation of feed disc 2 and of plate 32 is thus stopped when clutch 18—19 is uncoupled. This clutch may be of the conventional friction-type, as its illustration is diagrammatic.

The flow of air through branch pipe 34 is controlled by a valve V6. This valve is of the conventional two-way type, which is movable either to an inlet position or to an exhaust position. When valve V6 is in its inlet position, compressed air flows through pipe 34 and pin 33 is maintained in its operative position in which it uncouples clutch 18—19. When valve V6 is moved to its exhaust position, it closes the passage between the two branches of pipe 34 and puts cylinder C6 into communication with the outer atmosphere, so that the compressed air in cylinder C6 exhausts to the outer atmosphere, and pin 33 is moved back to its normal non-operating position of Fig. 3 by its biasing means, thus permitting the recoupling of clutch 18—19 by spring 24.

Valve V6 is biased by a spring or the like, to its normal exhaust position, which corresponds to the non-operating position of pin 33 which is shown in Fig. 3.

Valve V6 is moved to its inlet position by conventional electro-mechanical means which includes a solenoid or coil which is supplied with electric current to move valve V6 to its inlet position, when electric current flows through the branch circuit 70a—69a and through said coil or solenoid.

Fig. 1 shows the terminals 69 and 70 of the control circuit. The control circuit may operate by unidirectional current or alternating current.

For simplicity, it is assumed that direct current is supplied to terminals 69 and 70 and that the terminal 69 is the positive terminal and that terminal 70 is the negative terminal.

Wire 69a is connected to positive terminal 69 and wire 70a is connected to negative terminal 70.

Figs. 2 and 3 show a switch SW6 which is biased by a spring to normal circuit-opening position. When switch SW6 is temporarily closed, current is supplied to the electro-mechanical means which move valve V6 from its normal exhaust position to its temporary inlet position. Said electro-mechanical means temporarily maintain valve V6 in its inlet position, as long as the circuit of said electro-mechanical means remains closed by switch SW6.

Fig. 2 shows an operating rod 119 of switch SW6, which is temporarily closed when rod 119 is pushed inwardly into the casing of switch SW6. Rod 119 is biased to a normal position in which switch SW6 is open. The outer end of rod 119 has a roll which meshes with the teeth of a cam-gear 120, which has cam-teeth of the general spur-gear type.

Fig. 2 shows that the roll of rod 119 is located in a recess of cam-gear 120. Switch SW6 is then open.

As shown in Fig. 3, the cam-gear 120 is integral with a front clutch member 118, through which a horizontal and transverse shaft 8 extends. The clutch member 118 is freely slidable upon shaft 8 and is freely turnable relative to shaft 8. Shaft 8 has a front head 8a, which limits the forward transverse sliding movement of clutch member 118 on shaft 8.

Fig. 3 shows an associated rear clutch member 115, which has a transverse slot 116, which is parallel to shaft 8. A pin 117, which is fixed to shaft 8, extends into slot 116 so that clutch member 115 can slide transversely relative to shaft 8. Clutch member 115 turns in unison with shaft 8.

The adjacent end-walls of clutch members 115 and 118 have cooperating clutch teeth of the ratchet type, like the clutch teeth of clutch members 18—19, so that said clutch 115—118 is of the one-way type.

Clutch 115—118 may be of the one-way friction type. When shaft 8 is turned clockwise, the clutch member 115 slips relative to clutch member 118, so that clutch member 118 is not turned. When shaft 8 is turned counterclockwise, the clutch member 115 remains in engagement with clutch member 118, so that clutch member 118 is then turned counterclockwise. The clutch member 118 may be provided with a conventional brake which prevents said clutch member 118 from being turned clockwise. It is conventional to apply such a brake to clutch member 118 when clutch member 115 is turned clockwise.

Fig. 3 shows a disc 35, which is fixed to shaft 8, and a spring 38. The spring 38 operates as a torsion spring, for a purpose later described. Spring 38 also operates as a compression spring to urge or bias the rear clutch member 115 forwardly, in order normally to intermesh the ratchet clutch teeth of the clutch members 115 and 118.

Switch SW6 remains open and valve V6 remains in its exhaust position and pin 33 is maintained in its left non-operating position and clutch 18—19 remains coupled and disc 2 is oscillated, while shaft 8 is turned clockwise. As later explained, shaft 8 is turned clockwise when carriage 51 is moved longitudinally to the right in an operating stroke, and shaft 8 is turned counterclockwise when carriage 51 is moved longitudinally to the left in a return or idler stroke.

When shaft 8 is turned counterclockwise, and clutch members 115 and 118 remain engaged, the rod 119 is reciprocated.

The valve V6 is retained in its inlet position, in order to keep clutch 18—19 uncoupled and to stop the oscillation of disc 2, while carriage 51 is moved in its left stroke and while clutch 115—118 remains coupled to turn shaft 8 counterclockwise. For this purpose, switch SW6 is of the well-known type which closes quickly and opens slowly. When the roll of rod 119 abuts a crest of cam-wheel 120, switch SW6 is closed and it remains closed during the short interval in which the roll of its rod 119 is alined with a depression of cam-wheel 120. The left stroke of carriage 51 is rapid, so that switch SW6 is easily kept closed during the left movement of carriage 51, in order to maintain clutch 18—19 uncoupled during said left stroke.

At the end of said left stroke, the roll of rod 119 enters an aligned recess of cam-wheel 120, switch SW6 is opened, valve V6 is moved to its exhaust position and clutch 18—19 is re-coupled.

*Feed of wires 4 and 5 and supply of brush bristles 5 to wires*

In this example, the core of the brush element is made of two intertwisted wires 4 and 5.

Wire 4 is led from an upper reel, around the idler roll 6, and then to the right in a straight and longitudinal branch.

Wire 5 is led from another reel, around the transfer disc 7, which is fixed to the horizontal and transverse shaft 8. These wires are pulled off their respective reels under suitable tension, which is provided by applying suitable frictional braking resistance to the turning of said reels.

A front series of pins R and a rear series of pins Ra are fixed to transfer disc 7. These pins R and Ra are arranged in pairs which are transversely alined. The rear pins Ra are rearwardly transversely inclined relative to the median longitudinal vertical plane of disc 7, and the front pins R are forwardly transversely inclined relative to said median plane. Said opposed transverse angles are equal. Each pair of pins R and Ra is in a respective radial plane of disc 7.

Spaces are provided between the pairs of pins R and Ra. Some of these spaces are designated as Sa, Sb, Sc and S.

The number of said spaces may be varied.

Fig. 2 shows the space Sa in position to receive a pile of bristles B from the feed disc 2. Said feed disc 2 is rotated sufficiently clockwise in its respective clockwise feeding stroke so that it deposits all the bristles in recess 3 in space Sa.

At the beginning of the movement of carriage 51 to the right, the extreme right space S is in the bristlereceiving position of the extreme left space Sa which is shown in Fig. 3.

The bristles B are held between the straight branch of wire 5 and the upper straight branch of wire 4, during each movement of carriage 51 to the right, during which wires 4 and 5 are under selected tension. Said straight branches of wires 4 and 5 may be superposed and in the same vertical plane, or they may be transversely offset. During the movement of carriage 51 to the right, wire 5 may slidingly abut the top of table 40 of frame F of the machine.

Carriage 51 and its associated parts

The carriage 51 comprises a vertical plate which is slidable upon a pair of longitudinal rods 52 and upon a pair of longitudinal rods 53, which are fixed to frame F, and which fit closely and slidably in longitudinal bores of carriage 51. Said carriage 51 does not turn. Said carriage 51 has a horizontal and longitudinal extension 51a at its right end, from which a vertical arm extends upwardly. The left end of a flexible and resilient blade-spring pawl 72 is fixed to extension 51a.

A control disc 71, which has equal ratchet teeth at its periphery, is turnable about a horizontal and transverse shaft which is turnably mounted in frame F.

A set of equally spaced and transverse switch-operating pins 73 are fixed to control disc 71.

Fig. 1 shows carriage 51 at the extreme end of its right movement. Shortly before the end of each right movement of carriage 51, its pawl 72 engages a respective ratchet tooth of disc 71. Prior to engaging such ratchet tooth, pawl 72 is inclined upwardly, at a slight angle to its position of Fig. 1.

The disc 71 is turned through the arc of one ratchet tooth thereof, during each right stroke of carriage 51.

A suitable brake or the like, not shown, or other conventional means, are used to limit each counterclockwise stroke of disc 71 to the arc of one ratchet tooth.

Disc 71 controls switches SW1, SW4 and SW5, which are biased to normal open positions.

Switches SW4 and SW5 have operating rods, similar to the rod 119, which are fixed to a common head 83, to which a longitudinal left rod 84 is fixed.

Shortly before carriage 51 is moved to its extreme right position of Fig. 1, a respective pin 73 engages the roll at the left end of rod 84, and moves said rod 84 to the right, to the position shown in Fig. 1, in which switches SW4 and SW5 are temporarily closed and kept temporarily closed while disc 71 is maintained in the position of Fig. 1. Said rod 84 is biased to the left of its position of Fig. 1, to a normal non-operating position in which switches SW4 and SW5 are normally open.

The carriage 51 is quickly slid on the transversely alined pairs of rods 52 and 53 to the left, when compressed air is admitted to cylinder C4, which has a piston whose piston rod 54 abuts carriage 51 or is fixed to carriage 51.

Cylinder C4 is connected through branch pipe 55 and the casing of valve V4 to main pipe A.

Said valve V4 can be moved by electromechanical means to its inlet position from its exhaust position. Said electro-mechanical means are in the sub-casing marked "Valve open" in Fig. 1. Said valve V4 can be moved by other electro-mechanical means from its exhaust position to its inlet position. The last-mentioned electro-mechanical means are in the sub-casing marked "Release" in Fig. 1. This valve V4 is not biased to either of its positions.

At the end of the right stroke of carriage 51, valve V4 is shifted to its inlet position from its exhaust position by closing switch SW4, in order to supply compressed air to cylinder C4 and to move carriage 51 to the left by piston rod 54, in a rapid left stroke.

At the end of its left stroke, valve V4 is shifted from its inlet position to its exhaust position, thus exhausting the compressed air from cylinder V4, so that carriage 51 can be moved to the right, as later described.

Switch SW4 is associated with a conventional time-delay relay switch TS4, which is a well-known article of commerce, so that it does not require a detailed disclosure. Said relay switch has a relay coil and a switch-blade armature.

The respective ends of said relay coil are connected to wires 86 and 87, so that said relay coil remains energized, only when switch SW4 is closed. One end of said switch armature of relay switch TS4 is connected permanently to the terminal of wire 89, and the other end of said armature switch is biased away from the terminal of wire 87.

When switch SW4 is temporarily closed against the force of its biasing spring, current flows from positive terminal 69 through wires 75, 76, 77, and 85, switch SW4, wire 86, the relay coil of TS4, wire 87, through the electrical part of the means for shifting valve V4 from its exhaust position to its inlet position, and through wires 93a and 88 to negative terminal 70.

The energized relay coil quickly moves its armature against the force of the spring of said armature, to connect wires 89 and 87, so that current can flow through wire 89 and said armature and wire 87 to keep valve V4 in its inlet position, after switch SW4 has been opened and after the relay coil of TS4 has been de-energized. After said relay coil has been de-energized, there is a selected period of delay before the armature is moved to disconnect wires 89 and 87. The time-delay mechanism may be of any well-known type, as a dash-pot, clock mechanism, etc. The clock mechanism is preferred, whenever time delay is desired.

The wires 89 and 87 thus remain connected during a sufficient period after switch SW4 opens upon movement of carriage 51, so that valve V4 remains in inlet position until carriage 51 strikes pin 90, at the end of the left stroke of carriage 51. The carriage 51 then moves pin 90 to the left of the normal position to which pin 90 is biased. This normal position is shown in Fig. 1. When pin 90 is pushed to the left of its position of Fig. 1 by carriage 51 at the end of the left stroke of said carriage, said pin 90 closes the normally open switch SW4A, which is biased to circuit-opening position.

When switch SW4A is closed, current flows from positive terminal 69 through wires 75 and 91 and the temporarily closed switch SW4A, through wire 92, through the coil or solenoid of the electro-mechanical mechanism which shifts valve V4 from its inlet position to its exhaust position, and through wires 93 and 88 to negative terminal 70. Hence the compressed air is rapidly exhausted from cylinder C4 at the end of the left stroke of carriage 51.

The carriage 51 is moved slowly to the right by worm 56 and the half-nut or worm-follower 57. The right stroke of carriage 51 is much slower than its quick left stroke. Said worm 56 is rotatably mounted in a bearing of frame F, and it is rotatable about a horizontal and longitudinal axis. Said worm 56 extends through a smooth longitudinal bore of carriage 51. Said worm 56 is continuously rotated by motor 58, pulleys 59 and 60, and belt 61. The half-nut 57 is biased to its normal disengaged position of Fig. 1, in which said half-nut is maintained during the quick left movement or stroke of carriage 51. Said half-nut 57 is moved downwardly to mesh with worm 56, after carriage 51 has completed its left stroke and after valve V4 has been shifted to its exhaust position and after the compressed air has been exhausted from C4, by means of a piston in cylinder C3. The shank of half-nut 57 is fixed to said piston of cylinder C3.

Cylinder C3 is connected through branch pipe 62 and the casing of valve V3 to main pipe A. Said valve V3 is biased to its normal exhaust position, and it is operated to its temporary inlet position by respective electro-mechanical means. A longitudinal and horizontal rod 106 is slidable in alined bores of frame F and of carriage 51. Collars 107 and 108 and a rod 109 are fixed to rod 106. When carriage 51 is in its extreme right position of Fig. 1, it abuts collar 108, and rod 106 is in a shifted right position which is shown in Fig. 1, in which its rod 109 is spaced to the right of the rod 110 of switch SW3, which is biased to the normal open position.

Close to the end of the left movement of carriage 51, after valve V4 has been shifted to its exhaust position and after the compressed air has been exhausted from cylinder C4, carriage 51 strikes collar 107 and shifts rod 106 to the left, until rod 109 strikes the roll of rod 110 and moves said rod to close switch SW3 temporarily against the force of its biasing spring.

Current then flows from positive terminal 69 through wires 75, 76, 77 and 111, through the temporarily closed switch SW3, through wire 112 and the electromechanical means which shift valve V3 from its normal exhaust position to its temporary inlet position, and through wires 114 and 88 to negative terminal 70. The switch SW3 is maintained closed until carriage 51 strikes collar 108 and shifts rod 106 back to its position of Fig. 1, close to the end of the right stroke of carriage 51.

One end of a flexible band or strap 36 is fixed to carriage 51, as indicated by the arrow 36a in Fig. 1. The band 36 passes around disc 35 which is fixed to shaft 8. One end of band 36 is fixed by pin 37 to disc 35. One end of helical spring 38 is fixed to disc 35. The other end of spring 38 is fixed to frame F. As previously noted, spring 38 operates as a torsion spring, to bias disc 35 and shaft 8 to turn counterclockwise.

When carriage 51 is moved slowly to the right, band 36 slowly turns shaft 8 and discs 7 and 35 clockwise. When carriage 51 is moved to the left, the spring 38 rapidly turns shaft 8 and discs 7 and 35 counterclockwise.

*Clamp 39*

As shown in Fig. 1, frame F has a table extension 40 at its left. As previously noted, the straight run of wire 5 may slidably abut said table 40.

The clamp 39 is moved downwardly in order to clamp the straight runs of wires 4 and 5 against table 40, before chuck 42 is rotated to intertwist wires 4 and 5, as later explained.

Clamp 39 is biased to its normal upper position of Fig. 1. The shank of clamp 39 is fixed to a piston in cylinder C1, which is connected through branch pipe 41 and the casing of valve V1 to main pipe A.

Valve V1 is biased to its normal exhaust position, from which it is shifted by electro-mechanical means, which are controlled by switch SW1. This switch is biased to normal open position. Close to the end of the right movement of carriage 51, a respective pin 73 engages the roll of rod 74, thus raising rod 74 and temporarily closing switch SW1. When carriage 51 is in its extreme right position of Fig. 1, the roll of rod 74 is between respective pins 73 and rod 74 is in its normal biased position of Fig. 1 and switch SW1 is maintained open by its biasing spring. Hence said switch SW1 is closed temporarily during only a short period which is close to the end of the right stroke of carriage 51, and said switch SW1 is then opened and remains open at the end of said right movement.

When switch SW1 is temporarily closed, current flows from positive terminal 69 through wires 75, 76 and 77, through switch SW1, through wires 79 and 80 and the coil of relay switch TS1, and through wire 81 and the electro-mechanical operating mechanism of valve V1 to terminal 70. The relay switch TS1 is of said time delay type, so that it maintains the flow of current through the operating mechanism of valve V1 to keep said valve in its inlet position, during a selected period after switch SW1 has been opened. The relay coil of switch TS1 is connected to wires 80 and 81. When said relay coil is energized, its switch armature connects wires 82 and 81, which remain connected during a selected period thus maintaining valve V1 in inlet position during the selected period, and keeping clamp 39 in its clamping position during the selected period.

*Chuck 42*

Fig. 4 shows a horizontal and longitudinal chuck shaft 48 which is rotated about its horizontal and longitudinal axis in order to intertwist the wires 4 and 5 between the clamping zone of clamp 39 and the chuck 42, as later described.

This shaft 48 is rotated intermittently in order to intertwist wires 4 and 5 to the right of the zone in which clamp 39 clamps wires 4 and 5 against table 40. The shaft 48 is thus rotated, only at or close to the end of the right stroke of carriage 51, or after said stroke has been completed.

Head 47 is fixed to shaft 48. Jaws 43 and 44 are pivoted at 45 and 46 to head 47. A tension spring 50 biases the left clamping ends of jaws 43 and 44 away from each other. A collar 49 is longitudinally slidable on shaft 48.

When collar 49 is in the full-line position of Fig. 4, said collar 49 engages cam projections of jaws 43 and 44 and maintains their front ends in clamping position to clamp the wires 4 and 5 to the right of clamp 39. When collar 49 is in the broken-line position of Fig. 4, spring 49 biases jaws 43 and 44 to non-clamping positions in which they do not engage wires 4 and 5.

The jaws 43 and 44 are maintained in non-clamping position while carriage 51 is moved to the left. At the end of said left movement, jaws 43 and 44 are closed in order to clamp the wires 4 and 5. The wires 4 and 5 are then pulled to the right without intertwisting them, in unison with the clockwise movement of disc 7.

The clamp 39 is then moved to clamping position. The chuck 42 is then rotated during a short period by shaft 48 to intertwist wires 4 and 5 to the right of clamp 39 which then clamps wires 4 and 5 against table 40, in order to form an intertwisted core. The knives 64 and 63 are then operated to cut the respective brush element at its left end. The jaws 43 and 44 are then opened to release the respective brush element, which drops into a receptacle.

The clutch 42 is opened by pins 66 which are fixed to a head 67, which is fixed to a piston of cylinder C2, which is connected to main pipe A through branch pipe 103, the casing of valve V2 and branch pipe 104. Valve V2 is biased to its exhaust position from which it is shifted by electro-mechanical operating means, which are controlled by switch SW2, which is biased to normal open position.

A one-way pawl 98 is pivotally connected at 99 to a vertical arm of extension 51a. Said arm has a stop which limits the clockwise turning of pawl 98 relative to carriage 51. A light compression spring 100 abuts the tail of pawl 98 and maintains it yieldingly in vertical position.

Said pawl 98 has a top cam surface, which is inclined downwardly to the left. At the beginning of the left stroke of carriage 51, the top cam surface of pawl 98 upwardly thrusts the rod 97 of switch SW2 upwardly from the normal lower position to which said rod 97 is biased, thus temporarily closing switch SW2 during a short part of the left stroke of carriage 51.

The operating circuit of valve V2 is thus closed through wires 75 and 101, switch SW2, and wires 102, 105 and 88, thus shifting valve V2 temporarily from its normal exhaust position to its inlet position, so that pins 66 are moved to the left to strike collar 49 and move it to its release position, directly at the beginning of the left stroke of carriage 52. This releases the respective brush element, so that it falls out of the machine.

At the end of the left stroke of carriage 51, collar 49 strikes the annular shoulder 68 of frame F, thus shifting collar 49 to clamping position.

Cutting knives 64 and 63

These knives or shearing blades 64 and 63 are fixed to respective pistons of respective cylinders C5, which are connected by a common branch pipe 65 and a common valve V5 to branch pipe A. Valve V5 is biased to normal exhaust position and it is shifted by electromechanical means to temporary inlet position. Valve V5 is controlled by normally open switch SW5, which, as previously noted, is maintained closed when carriage 51 is at the end of its right movement. When switch SW5 is temporarily closed while carriage 51 is at the end of its right stroke, the circuit of the operating means of valve V5 is closed through wires 75, 76, 94, SW5, 95, 96 and 88.

Means for revolving chuck-shaft 48

A motor M, which is operated by compressed air, is fixed to carriage 51. Said motor M rotates shaft 48, when compressed air is supplied to motor M. When compressed air is not supplied to motor M, the shaft 48 is not rotated.

Motor M is connected to main pipe A through branch pipe 41a, which is an extension of flexible branch pipe 41, so that valve V1 controls the supply of compressed air to motor M, which is not rotated while valve V1 is maintained in its exhaust position.

Hence motor M is operated simultaneously with clamp 39. Clamp 39 preferably has a very short stroke to its clamping position and conventional retarding means, such as a spring-biased valve, may be provided in pipe 41a in order to permit clamp 39 to firmly clamp wires 4 and 5, before motor M begins to rotate shaft 48.

Cycle of operations

For convenience, it is assumed that the cycle begins at the time that carriage 51 is in its extreme left position.

At said beginning of the cycle, the positions of the parts are as follows:

Switch SW1 is open, the circuit of the relay coil of TS1 is open, valve V1 is maintained in its exhaust position, in which no compressed air is supplied to motor M, which does not rotate. Also, cylinder C1 is at atmospheric pressure and clamp 39 is retracted to its upper, non-clamping position.

Switch SW2 is open, and valve V2 is in its exhaust position, so that cylinder C2 is at atmospheric pressure, and rods 66 are in their retracted position.

Switch SW3 is closed, valve V3 is in its inlet position, and compressed air is supplied to cylinder C3 in order to mesh follower 57 with worm 56.

Switch SW4 is open, thus the circuit of the relay coil of TS4 is open, thus de-energizing the electromechanical means which hold valve V4 in its inlet position, so that valve V4 can be shifted to its exhaust position.

Switch SW4A is closed, thus energizing the electromechanical means which shift and hold valve V4 in its exhaust position, so that the pressure in cylinder C4 is at atmospheric pressure, so that carriage 51 can be moved to the right by worm 56 and follower 57.

Switch SW5 is open, valve V5 is in its exhaust position, the cylinders C5 are at atmospheric pressure, and the knives 64 and 63 are in their retracted, non-cutting positions.

Plate 49 is in its full-line position of Fig. 4 and chuck-jaws 43 and 44 grip the ends of wires 4 and 5.

Switch SW6 is open, valve V6 is in its exhaust position, cylinder C6 is at atmospheric pressure, pin 33 is in retracted position, clutch 18—19 is engaged, the recess 3 of disc 2 is in the left position of Fig. 1, and the oscillation of disc 2 is about to begin.

The carriage 51 is then shifted to the right, thus pulling wires 4 and 5 to the right without inter-twisting said wires, while disc 2 is oscillated at a sufficient rate, and while disc 7 is slowly turned clockwise by band 36, and while clutch member 115 slips relative to clutch member 118, so that gear 120 remains stationary and switch SW6 remains open.

Close to the end of its right movement, carriage 51 strikes collar 108, thus shifting rod 106 and its switch-actuating rod 109, thus releasing switch SW3 which opens so that valve V3 is moved by its biasing spring to its exhaust position, thus restoring the pressure in cylinder C3 to atmospheric pressure, and thus retracting follower 57 and releasing it from screw 56. The momentum of the carriage 51 is sufficient to complete the very short remaining part of its right stroke.

Close to the end of its right movement, the pawl-blade 72 engages wheel 71.

Switch SW1 is rapidly closed and kept closed for a very short period and switch SW1 is then immediately released so that its blade is moved immediately by its biasing spring to open position.

During the short period in which switch SW1 is closed, the circuit of the relay coil of TS1 is closed through wires 75, 76, 77, 79, 80 and 81, and the operating coil of valve V1, so that the relay armature of TS1 is shifted to connect wires 82 and 81 and to keep valve V1 in its inlet position during a selected period after switch SW1 is opened.

Compressed air is now supplied to cylinder C1, clamp 39 is moved to clamping position, and compressed air is supplied to motor M so that it is rotated to intertwist wires 4 and 5 at the right of the clamp 39. This intertwisting preferably begins when the right movement of carriage 51 is completed or almost completed.

Switch SW4 is closed to close the circuit of the relay coil of TS4 so that its relay armature is moved to connect wires 89 and 87, thus shifting valve V4 to its inlet position and keeping valve V4 in its inlet position during a selected period.

The closing of valve V4 supplies compressed air to cylinder C4, in order to shift carriage 51 to the left, after the right stroke of carriage 51 has been completed.

Switch SW5 is closed simultaneously with switch SW4, or switch SW5 may be closed a short period before switch SW4 is closed. The closing of switch SW5 causes valve V5 to be moved to its inlet position, thus moving the cutter means 64 and 63 to cutting position, in which they cut the wires in a cutting zone which is located between the clamping zone and the motor M.

At the beginning of the left stroke of carriage 51, which results from the closing of switch SW4, switches SW4 and SW5 are automatically opened. The cutter means 64 and 63 are thus shifted to non-cutting position, but valve V4 is kept in open position by the time-delay means until the carriage 51 has completed its left stroke.

During the left stroke of carriage 51, the clutch 115—118 remains coupled and rod 119 is actuated to close switch SW6, so that pin 33 is kept in uncoupling position, thus keeping disc 2 uncoupled and preventing any feed of brush bristles during the left stroke of carriage 51. As above explained, switch SW6 is of the type which closes quickly and opens slowly, so that it does not open during the left stroke of carriage 51, during the short period in which rod 119 is alined with respective recesses of cam wheel 120.

At the end of the left stroke of carriage 51, chuck 42 is automatically closed by striking frame F, switch SW4A is automatically closed and switch SW3 is automatically closed.

The closing of switch SW4A causes the movement of valve V4 from inlet position to exhaust position. The closing of switch SW3 moves valve V3 from exhaust position to inlet position, thus coupling worm 56 to the carriage 51, and maintaining such coupling until carriage 51 strikes collar 108 close to the end of the right stroke of carriage 51.

Also, the switch SW2 is temporarily closed at the beginning of the left stroke of carriage 51, thus releasing the right or rear end of the respective completed brush element.

The valve V3 may be fixed to frame F and the branches of pipe 62 are sufficiently long and flexible to permit the movement of carriage 51 in respective opposed directions.

For convenience, certain parts and movements are designated as follows:

The extreme left position of carriage 51 is designated as its initial position or front position. The movement of carriage 51 from right to left is designated as its forward movement or return movement or non-operating movement.

The extreme right position of carriage 51 is designated as its final position or rear position. The movement of carriage 51 from left to right is designated as its rearward movement or operating movement.

The invention is not limited to a longitudinal or straight-line non-operating and operating movements of carriage 51.

The movement of clamp 39 is a transverse movement. The pivots 45 and 46 are lateral pivots.

The hub or collar 17 is the main driving shaft, and shaft 14 is the main driven shaft. Clutch member 18 is the primary clutch member and clutch member 19 is the secondary clutch member.

The clockwise turning movement of transfer wheel 7, during the rearward movement of carriage 51 to the right, is the transfer movement. The counterclockwise movement of transfer wheel 7, during the forward movement of carriage 51 to the left, is the reverse movement of transfer wheel 7.

Switch SW1 is the first switch, valve V1 is the first valve, and cylinder C1 is the first cylinder. As above noted, valve V1 is biased to normal exhaust position and the means for moving valve V1 to temporary inlet position are the first electro-mechanical means, which are controlled by the normally open first switch SW1. As above noted, the first switch SW1 is kept closed during a short part of the rearward stroke of carriage 51, at or close to the end of rear rearward stroke.

These first parts exemplify control means whereby power is automatically supplied to motor M, only at or close to the end of the rearward stroke of carriage 51, after the clamping means have been moved from normal non-operating position to operating clamping position.

The normally open switch SW2 is the second switch, valve V2 is the second valve and cylinder C2 is the second cylinder. These parts exemplify control means for automatically releasing the rear end of the respective brush element after it has been completed and it has been severed at its front end. This is done close to the beginning of the forward stroke of carriage 51.

The normally open switch SW3 is the third switch, valve V3 is the third valve and cylinder C3, which is fixed to carriage 51, is the third cylinder. These parts, in combination with worm 56, exemplify automatic means for shifting the carriage 51 in its rearward stroke, when carriage 51 has reached its extreme front or left or initial position.

Switch SW4 is the fourth switch, valve V4 is the fourth valve and cylinder C4 is the fourth cylinder. These parts exemplify automatic means for shifting carriage 51 forwardly to the left, when carriage 51 has reached its extreme rear or right position, which is also designated as its final position.

Switch SW5 is the fifth switch, valve V5 is the fifth valve, and cylinders C5 are the fifth cylinder-means. These parts exemplify cutter-means and automatic means for operating said cutter means to sever the front or left end of the brush element, at or close to the end of the rear stroke of carriage 51, shortly before the rear end of the respective brush element is released.

Switch SW6 is the sixth switch, valve V6 is the sixth valve, and these parts, in combination with clutch members 115 and 118 and cam-wheel 120, constitute automatic means for uncoupling the main drive which oscillates the feed-disc only during the forward movement of carriage 51 to its left or initial or front position.

The invention includes the sub-combinations of the complete mechanism.

The invention is not limited to pneumatic or compressed-air devices.

In general, the invention, irrespective of the details disclosed herein, includes a machine which has all or less than all of the following characteristics:

A carriage is moved automatically in respective opposed directions in a non-operating stroke and in an operating stroke; a motor and a chuck are mounted on said carriage; at the beginning of said operating stroke, said motor is non-operating and said chuck is automatically closed and grips a plurality of transversely spaced wires or other inter-twistable members; during said operating stroke, said carriage pulls said wires along and bristles are automatically fed between said transversely spaced wires or intertwistable members during said operating stroke; close to the end of said operating stroke or at the end of said operating stroke, said wires or intertwistable members are automatically clamped at a point spaced from said motor, and said motor is automatically operated simultaneously with or immediately after said clamping action, in order to rotate said chuck and intertwist said wires or the like; after the intertwisting has been completed and shortly prior to the end of the operating stroke or at the end of said operating stroke, the intertwisting is stopped and the clamping means are released from the wires; at the end of the operating stroke, and optionally and preferably before the clamping means are released from the wires, cutter means are operated to cut the wires in a cutting zone which is between the clamping zone and the chuck, and the cutter means are then withdrawn from the wires; at the beginning of the non-operating stroke, the chuck is opened to release the respective end of the respective brush element, which drops out of the machine; at the end of the non-operating stroke, the clutch automatically closes and grips the ends of the wires.

During the non-operating stroke of the carriage, the feed of brush bristles is automatically stopped.

A preferred embodiment of this invention has been described, but numerous changes and omissions and additions and substitutions can be made without departing from its scope. The invention also includes numerous sub-combinations disclosed herein.

What is claimed is:

1. A machine for making a brush element which consists of a plurality of intertwisted wires which clamp intermediate brush bristles, said machine comprising a frame which has longitudinal guide means, a carriage which is longitudinally movable to-and-fro on said guide means in a forward non-operating stroke to a front initial position and in a rearward operating stroke to a rear final position, a main driving shaft, a main driven shaft, a releasable main clutch to couple and uncouple said main driving shaft and said main driven shaft, said main clutch being biased to coupling position, a control pin for said main clutch, said control pin being biased to a normal position in which said main clutch remains coupled, said control pin being movable to an operating position in which it holds said main clutch uncoupled, a feed disc, said feed disc being adapted to be oscillated between a receiving position and an outlet position, means connecting said main driven shaft and said feed disc and adapted to so oscillate said feed disc at a selected frequency, said feed disc having a peripheral recess to receive bristles in its said receiving position, a turnable transfer wheel which has peripheral pockets, said transfer wheel having a drum, a flexible band, one end of said band being fixed to said drum, the other end of said band being fixed to said carriage, a part of said band being coiled around said drum, said band being operative to turn said transfer wheel during said operating stroke to take up successive supplies of brush bristles from said peripheral recess in said peripheral pockets, said disc being oscillated with sufficient frequency to deliver a supply of bristles from said peripheral recess successively to said pockets, means to turn said transfer wheel reversely during said non-operating stroke, means to supply a plurality of transversely spaced longitudinal wires through said pockets to locate and grip the bristles in said pockets between said wires, a movable clamp which is movable in a clamping zone which is located rearwardly of said transfer wheel, movable cutting means which are movable in a cutting zone which is located rearwardly of said clamping zone and forwardly of said final position, a motor mounted on said carriage, said motor having a longitudinal shaft and being operable by compressed air, a chuck, said chuck having a chuck head which is fixed to said shaft and chuck gripping means movably connected to said chuck head, a longitudinal worm, worm-rotating means connected to said worm and adapted to rotate said worm around its longitudinal axis, a worm-follower movably mounted on said carriage and biased to normal position in which it is unmeshed from said worm, a carriage-actuating cylinder which has a carriage-actuating piston which is adapted to move said carriage in its forward non-operating stroke, additional respective cylinders which have respective pistons which are respectively adapted to operate said movable clamp and said cutting means and to shift said chuck gripping means to release position, said frame having control means adapted to shift said chuck gripping means to gripping position substantially at the end of said non-operating stroke to grip the wires, a supply pipe which is adapted to supply compressed air, said supply pipe being connected to said motor and said cylinders by respective connecting pipes through respective movable control valves, electro-mechanical means for operating said control valves, a circuit which has switches for controlling the supply of electric current to said electro-mechanical means, switch-operating means operated by said carriage in a cycle to close said clutch gripping means substantially at the beginning of said operating stroke and to keep said clutch gripping means closed during substantially the entire operating stroke and to release said clutch gripping means substantially at the beginning of said non-operating stroke, and to mesh said worm-follower with said worm at the beginning of said operating stroke and to keep said worm-follower meshed with said worm during said operating stroke and to unmesh said worm-follower from said worm at the end of said operating stroke and to keep said worm-follower unmeshed from said worm during said non-operating stroke, and to move said clamp to clamping position substantially at the end of said operating stroke, and to supply compressed air to said motor to rotate said chuck and to intertwist said wires after said clamp has been moved to clamping position, and to operate said cutting means to cut said intertwisted wires subsequent to said intertwisting and to keep said control pin in operating uncoupling position during the non-operating stroke of said carriage.

2. A machine according to claim 1, in which the switch which is associated with the valve of the cylinder whose piston operates said control pin is normally open and is a quick-closing slow-opening switch, a cam wheel for operating said associated switch, said cam-wheel having spaced projections which urge said switch to closing position, said cam-wheel being coupled to said transfer wheel by a one-way clutch which is operative only during the non-operating stroke of said carriage, said cam wheel having recesses between said projections, said associated switch having a switch rod which is located in one of said recesses to keep said associated switch open at the end of said non-operating stroke and during said operating stroke.

3. A machine for making a brush element which consists of a plurality of intertwisted wires which clamp intermediate brush bristles, said machine comprising a frame, a carriage longitudinally movable to-and-fro on said frame in a forward non-operating stroke to a front initial position and in a rearward operating stroke to a rear final position, a longitudinal chuck shaft rotatably mounted on said carriage, movable clamping means operable in a clamping zone which is located forwardly of said initial position, movable cutter means operable in a cutting zone which is located between said clamping zone and said final position, a chuck, said chuck having a head which is fixed to said chuck shaft and chuck-gripping-means movably connected to said chuck-head, wire-supply means for supplying wires to said chuck in said initial position of said carriage, movable bristle-feeding means for feeding bristles between said wires forwardly of said clamping zone, respective automatic mechanisms for automatically actuating said carriage and for rotating said shaft and for closing and opening said chuck-gripping-means and for operating said clamping means and for operating said cutter means and for rotating said shaft and for operating said bristle-feeding means, the mechanism for moving said carriage in its operating stroke including a longitudinal worm mounted upon said frame, means for continuously rotating said worm, a worm-follower movably mounted on said carriage and adapted to mesh with said worm, actuating means for said worm-follower controlled by said carriage and adapted to mesh said worm-follower with said worm during said operating stroke and to unmesh said worm-follower from said worm during said non-operating stroke, said respective mechanisms being operable in an automatic cycle to close said chuck-gripping means substantially at said initial position to grip said wires, and to keep said chuck-gripping means closed during said operating stroke, and to operate said clamping means to clamp said wires substantially at the completion of said operating stroke, and to rotate said chuck-shaft substantially only at the completion of said operating stroke to intertwist said wires, and to actuate said bristle-feeding means to feed bristles during said operating stroke, and to operate said cutting means substantially at the completion of said operating stroke, and to open said chuck-gripping-means during said non-operating stroke, and to stop the operation of said bristle-feeding means during said non-operating stroke.

4. In a fully automatic machine for forming a brush, a frame, a carriage longitudinally movable to-and-fro on said frame in respective operating and non-operating strokes of predetermined length, means mounted upon said frame for supporting an upper and a lower wire with leading portions substantially parallel and adjacent to each other, each wire being continuous with its leading portion having an exposed end, a reciprocatable and rotatable chuck for gripping said ends of the wire and mounted upon said carriage, mechanism for moving said carriage in its operating stroke to pull the wires gripped by said chuck through a distance of said predetermined length, said mechanism including a longitudinal worm mounted upon said frame, means for continuously rotating said worm, a worm-follower movably mounted on said carriage and adapted to mesh with said worm, actuating means for said worm-follower controlled by said carriage and adapted to mesh said worm-follower with said worm during said operating stroke and to unmesh said worm-follower from said worm during said non-operating stroke, means for feeding bristles onto the lower wire between it and the upper wire as said wires are being pulled by the chuck, means for gripping the wires remote from the exposed ends, means for rotating the chuck to twist the wires and lock the bristles therebetween, and mechanism for moving said carriage in its non-operating stroke.

5. In a fully automatic machine for forming a brush, a frame, a carriage longitudinally movable to-and-fro on said frame in respective operating and non-operating strokes, means mounted upon said frame for supporting an upper and lower wire with leading portions substantially parallel and adjacent to each other, each wire being continuous with its leading portion having an exposed end, mechanism for moving said carriage in its operating stroke, means mounted upon said carriage for gripping said ends of said wire and for thereby drawing the wires through the machine with said ends in the lead, said mechanism including a longitudinal worm mounted upon said frame, means for continuously rotating said worm, a worm-follower movably mounted on said carriage and adapted to mesh with said worm, actuating means for said worm-follower controlled by said carriage and adapted to mesh said worm-follower with said worm during said operating stroke and to unmesh said worm-follower from said worm during said non-operating stroke, means for feeding bristles onto the lower wire between it and the upper wire, means for twisting the wires to lock the bristles therebetween, means for cutting the twisted wires to form a brush, and mechanism for moving said carriage in its non-operating stroke.

References Cited in the file of this patent

UNITED STATES PATENTS

| | | |
|---|---|---|
| 1,888,352 | Lipps | Nov. 22, 1932 |
| 1,941,343 | Epp | Dec. 26, 1933 |
| 2,105,334 | Scully | Jan. 11, 1938 |
| 2,234,641 | Baumgartner | Mar. 11, 1941 |
| 2,358,443 | Cave | Sept. 19, 1944 |